United States Patent [19]

Watson et al.

[11] 3,728,687

[45] Apr. 17, 1973

[54] VECTOR COMPARE COMPUTING SYSTEM

[75] Inventors: William J. Watson; William D. Kastner, both of Austin, Tex.

[73] Assignee: Texas Instruments Incorporated, Dallas, Tex.

[22] Filed: Jan. 4, 1971

[21] Appl. No.: 103,540

[52] U.S. Cl. .......... 340/172.5

[51] Int. Cl. .......... G06f 7/00

[58] Field of Search .......... 340/172.5, 324, 146.3; 307/231, 235; 179/15 AW

[56] References Cited

UNITED STATES PATENTS

| | | | |
|---|---|---|---|
| 3,541,516 | 11/1970 | Senzig | 340/172.5 |
| 3,438,003 | 4/1969 | Bryan | 340/172.5 |
| 3,521,235 | 7/1970 | Becker | 340/146.3 |
| 3,406,387 | 10/1968 | Werme | 340/324 |

*Primary Examiner*—Harvey E. Springborn
*Attorney*—James O. Dixon, Andrew M. Hassell, Harold Levine, Melvin Sharp, Rene E. Grossman and James T. Comfort

[57] ABSTRACT

A computing system is shown specifically adapted for processing vectors. Two vector streams, each vector stream having an ordered array of elements, are compared and the relationship between the elements in the two vector streams are determined. The computing system may determine when specific elements of the two vector traces are equal to each other, when an element in the first is greater than an element in the second, when an element in the first is greater than or equal to an element in the second, when an element in the first is less than an element in the second, when an element in the first is less than or equal to an element in the second, when an element in the first is unequal to an element in the second and when for each element in vector trace A there is a corresponding element in vector trace B.

4 Claims, 3 Drawing Figures

INVENTORS
William J. Watson
William D. Kastner

BY Jim Comfort
ATTORNEY

| INPUT | | | OUTPUT | | |
|---|---|---|---|---|---|
| G | E | | L | G | E |
| 0 | 0 | | 1 | 0 | 0 |
| 0 | 1 | | 0 | 0 | 1 |
| 1 | 0 | | 0 | 1 | 0 |

TABLE 2
FOR DECODER LOGIC 16

VECTOR COMPARE COMPUTING SYSTEM

This invention is directed to a vector computing system and more specifically to a vector computing system where two vector streams are compared and the relationship between the elements in the vector streams are determined.

It is therefore an object of this invention to provide a new and improved computing system specifically adapted for vector operations.

Another object of this invention is to provide a new and improved computing system adapted for comparing two vector streams and determining predetermined relationships between those two vector streams.

A vector $X$ is the array of elements $(x_1, x_2, x_3, \ldots, x_{v(x)})$. The variable $x_i$ is called the $i$th component of the vector $X$, and the number of components, denoted by $v(x)$ (or simply $v$ when the determining vector is clear from context), is called the dimension of $x$. A numerical vector $X$ may be multiplied by a numerical quantity $k$ to produce the scalar times vector multiply $k \times X$ (or $kX$) defined as the vector $Z$ such that $z_i = k \times x_i$.

All elementary operations defined on individual variables are extended consistently to vectors as component-by-component operations. For example, $$Z = X + Y \leftrightarrow z_i = x_i + y_i,$$

$$Z = X \times Y \leftrightarrow z_i = x_i \times y_i,$$

$$Z = X \quad Y \leftrightarrow z_i = x_i \quad y_i,$$

$$Z = |X| \leftrightarrow z_i = |x_i|,$$

$$W = U \Lambda V \leftrightarrow w_i = u_i \Lambda v_i,$$

$$W = (X < Y) \leftrightarrow w_i = (x_i < y_i).$$

Thus if $X = (1,0,1,1)$ and $Y = (0,1,1,0)$ then $X + Y = (1,1,2,1)$, $X \Lambda Y = (0,0,1,0)$, and $(X < Y) = (0,1,0,0)$.

A matrix $M$ is the ordered two-dimensional array of variables $$M_1^1, M_2^1, \ldots, M_v^1(\mathrm{M})$$

$$M_1^2, M_2^2, \ldots, M_v^2(\mathrm{M})$$

$$M_1^{\mu} \ {}^{(M)}, \ldots, M_{v(M)}^{\mu} \ {}^{(M)}$$

The vector $(M_1^i; M_2^i, \ldots, M_{v(M)}^i)$ is called the $i$th row vector of $M$ and is denoted by $M^i$. Its dimension $v(M)$ is called the row dimension of the matrix. The vector $(M_j^1, M_j^2, \ldots, M_j^{\mu(M)})$ is called the $j$th column vector of $M$ and is denoted by $M_j$. Its dimension $\mu(M)$ is called the column dimension of the matrix.

The variable $M_j^i$ is called the $(i,j)$th component or element of the matrix. Operations defined on each element of a matrix are generalized component by component to the entire matrix. Thus, if 0 is any binary operator, $$P = M \, 0 \, N \leftrightarrow P_j^i = M_j^i \, 0 \, N_j^i.$$

Figure 2:
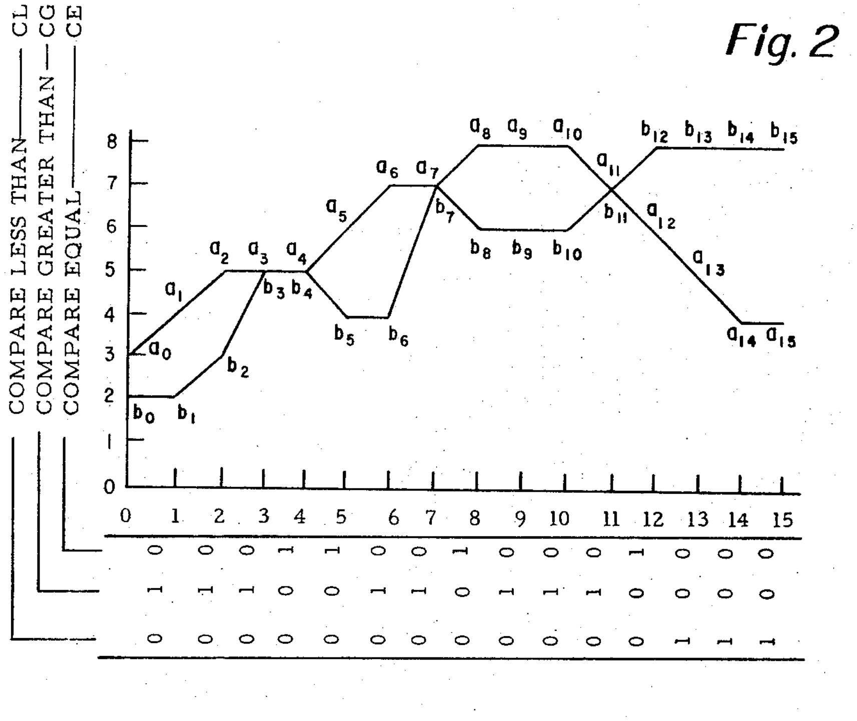
FIG. 2 shows two vector traces.
Figure 3:
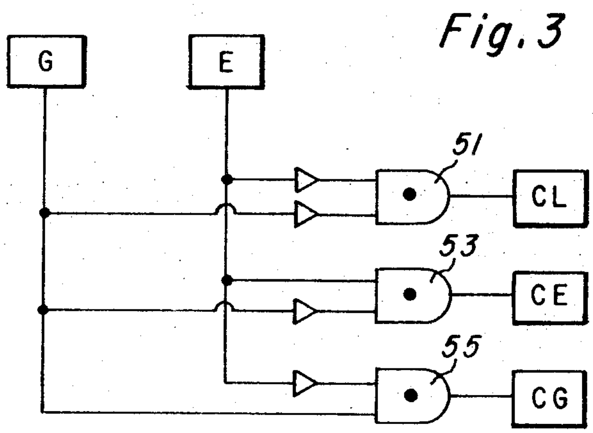

TABLE 1 shows the various options available for comparing the two vector traces shown in FIG. 2, FIG. 3 shows the logic for the arithmetic compare flip-flop.

The hardware and logic shown in the drawings is contained in the arithmetic unit of the stored program computer. The inputs to the system are from the memory buffer unit and the outputs are back to the memory buffer unit. The clock pulses and control signals are from the instruction control unit of the computer. The configuration of such a computer is shown in copending application Ser. No. 744,190, by William D. Kastner et al., filed on July 11, 1968, now abandoned, and a continuation-in-part filed Apr. 28, 1972, Ser. No. 248,690 and assigned to the same assignee as the present application. The disclosure of the original application shows the basic computer.

Figure 1:
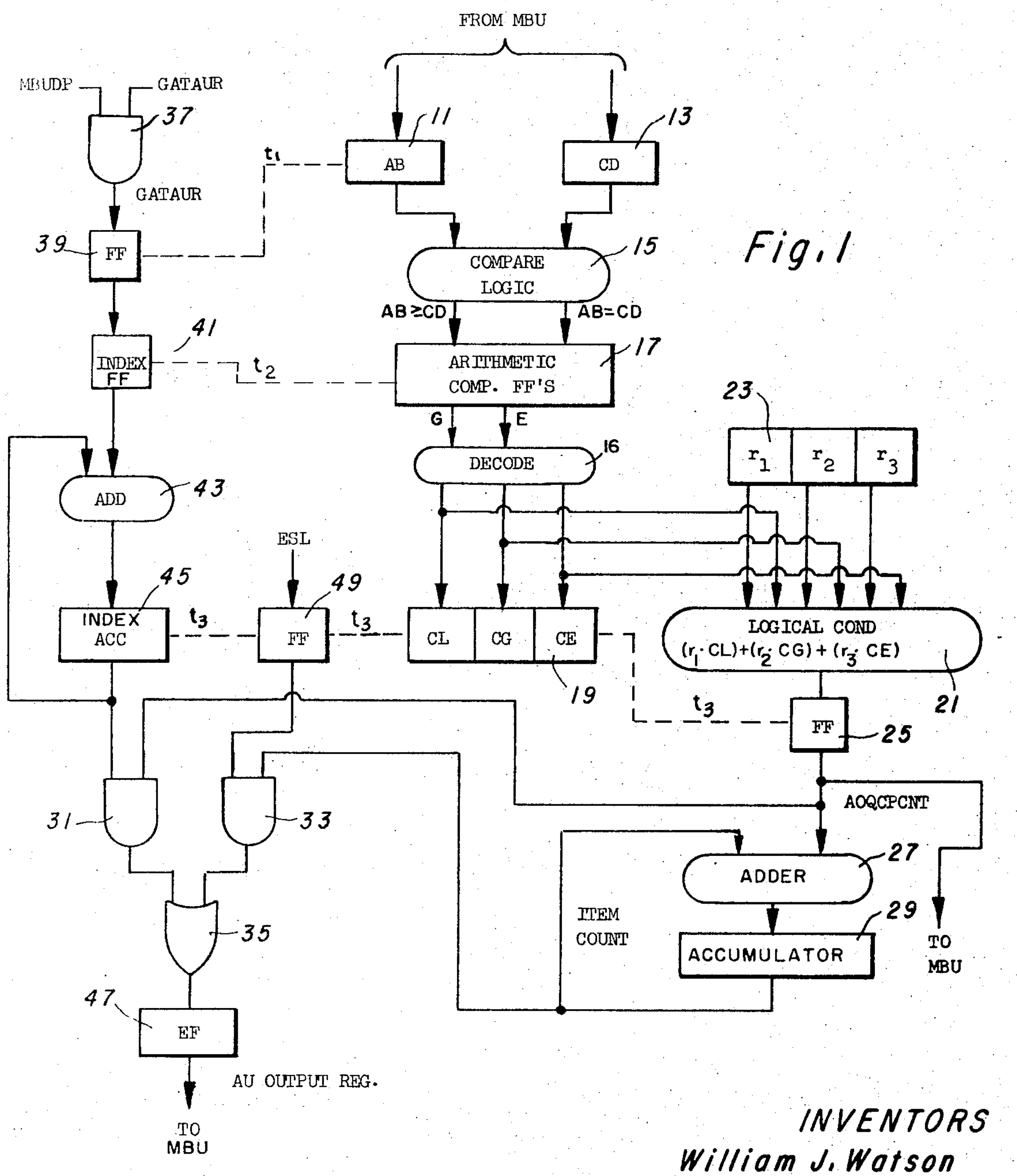
FIG. 1 shows the apparatus for comparing two vector streams or traces.

Refer to FIGS. 1 and 2. FIG. 1 shows the system and FIG. 2 shows an A vector trace and a B vector trace.

Referring now to FIG. 1, the vector traces are applied to input registers 11 and 13 from the memory buffer registers with vector trace A applied to the AB register 11 and vector trace B applied to CD register 13. Both of these registers are connected to an arithmetic compare logic circuit 15. Compare logic 15 is a network which subtracts *CD* from *AB* and outputs two signals, one of which is a "1" if the result of the subtraction is positive, else "0;" the other of which is a "1" if the result of the subtraction is zero, else a "0". The outputs from the compare logic 15 is stored in arithmetic compare flip-flops 17. The arithmetic compare flip-flops 17 are applied to three flip-flops 19CL, 19CG and 19CE through decode logic 16. CL refers to COMPARE LESS THAN, CG refers to COMPARE GREATER THAN and CE refers to COMPARE EQUAL TO. These references will be used in the following description and are shown in FIG. 2.

The CL, CG and CE input terminals to flip-flops 19 are also applied to a logical condition circuit 21. Register 23 contains the three least significant bits of the option field of the vector comparison instruction. This register will be referred to as the option field register in the following description. The option field register 23 specifies the options shown in Table 1. The option field register 23 has its outputs applied to the logical condition circuit 21 where the three bit option field is compared with the CL, CG and CE inputs from the arithmetic compare flip-flops 17. The logical condition circuit performs the operation specified by the equations shown in TABLE 1 and in the drawing.

The output from the logical condition circuit 21 is applied to flip-flop 25. All flip flops in FIG. 1, including flip-flop 25, are clocked and function in the same manner. The operation of flip flops is known to those skilled in the art. If the input to a flip-flop is a one, then the output of the flip-flop is a one after the next clock; if the input to a flip-flop is a zero, then the output of the flip-flop is a zero after the next clock. The output from flip-flop 25 is available to a memory buffer unit and is applied to an accumulator 27 storing the results of accumulator 27 in a register 29. The accumulator 27 and register 29 are used for adding and counting in a manner to be described. The output from flip-flop 25 is also applied to an AND circuit 31. Two signals are applied to AND circuit 37. The inputs to this are the gate receiver signal and the memory buffer unit data present signal. When both of these signals are applied to input AND circuit 37, flip-flop 39 is set. Flip-flops 39 and 41 are used to follow the flow of the comparison of the two vector traces through the processing circuitry. Flip-flop 41 creates a one clock delay for synchronization purposes. Flip-flop 41 is connected to an adder 43 which adds the contents of register 45 to flip-flop 41 and stores the results in a register 45. Register 45 applies another input to AND circuit 31 with the output of AND circuit 31 connected to the input of OR circuit 35. The output from OR circuit 35 is connected to an EF register 47 which is an output register. The output from register 47 is available to a memory buffer unit for further processing.

A signal is applied to flip-flop 49 to cause the transfer of the item count in register 29 to the output register 47 via AND gate 33 and OR gate 35. The other input to AND circuit 33 comes from the accumulator register 29.

The output from AND circuit 33 is applied through OR gate 35 to the AU output register 47.

Before a specific operation of the processing circuitry is described, FIG. 2 will be described in more detail. As described previously, FIG. 2 shows a first vector trace A and a second vector trace B. The first vector trace A has a plurality of vector elements $a_0$–$a_{15}$. The vector trace B has a plurality of vector elements $b_0$–$b_{15}$. The truth values shown in FIG. 2 below the two vector traces show the three conditions established for each vector element $A_i$ and $B_i$. The conditions are CL — COMPARE LESS THAN, CG — COMPARE GREATER THAN, and CE — COMPARE EQUAL.

Each element of vector trace A and vector trace B are compared to determine the truth values. If an element in vector A is greater than an element in vector B then a "1" is placed in the CG position, if an element in vector A is equal to an element in vector B, then a "1" is put in the CE column. If an element in vector trace A is less than an element B in vector trace B, then a "1" is put in the CL column. Zeroes are put in the other two columns for each comparison.

In TABLE 1, the various options are shown. The first option is where an element $A_i$ is equal to $B_i$, the second option is where an element $A_i$ is greater than an element $B_i$, the third option is where an element $A_i$ is greater than or equal to $B_i$, the fourth option is where $A_i$ is less than $B_i$, the fifth option is where $A_i$ is less than or equal to $B_i$, the sixth option is where $A_i$ is not equal to $B_i$, the seventh option is where in one use or definition there is an $A_i$ for a $B_i$ which may otherwise be stated as $A_i$ is less than or equal to $B_i$ or $A_i$ is greater than $B_i$. The last option is when there is no test. For each of these conditions, TABLE 1 shows the indices for the elements satisfying these conditions and before the specific indices for the elements an item count which shows the number of items for which that option is true. For instance, when $A_i$ is equal to $B_i$ is at indices 3, 4, 7 and 11 in FIG. 1 an item count of 4 results.

Now, for a specific description of the operation of the circuitry shown in FIG. 1; refer to FIG. 2 where the $A_6$ element in the A vector trace is seven and the $B_6$ element in the vector trace B is four. The $A_6$ element (seven) is transferred to AB register 11 and the $B_6$ element (four) is transferred to CD register 13. They arrive at the same time. They are compared in the COMPARE logic 15. Compare logic 15 is a simple subtraction circuit, known to those skilled in the art, with logic to test for result positive and result zero. Suppose that the option in the option field register is the option $A_i$ greater than $B_i$ shown in TABLE 1. With this option stored in the option register 23, a 010 is stored with R1 set to zero, R2 set to one, R3 set to zero. Using the COMPARE logic 15, the seven in the AB register 11 is compared with the four in the CD register 13. COMPARE logic 15 will deliver a true condition for AB ≥ CD and a false condition for AB = CD as shown in the FIG. 2 under the index 6 indicating that element $A_6$ (seven) is greater than element $B_6$ (four). This is indicated by a $G$=1 and $E$ =0 being produced in the arithmatic flip-flops 17 and applied to decode logic 16 to set input register 19 to 010. This 010 is also applied to the logic condition circuit 21 where it is compared with the contents of the option register 23. The option register 23 is also 010 so that the output of logic circuit is a 1 setting flip-flop 25 to 1.

The logic for the arithmetic compare flip-flop 17 is shown in FIG. 3. There are two output flip-flops, $G$ and $E$ in the logic compare unit 17 which are connected through three AND gates 51, 53 and 55 in decode logic 16. They are connected through inverters as shown on the outputs from the G and E flip-flops. truth table which shows all possible outputs for all possible inputs to decode logic 16 is shown in Table 2.

The logic compare condition operation in logic condition circuit 21 is carried out by the equation shown. With flip-flop 25 set to 1 indicating that there is a satisfaction of the condition that $A_i$ is greater than $B_i$ for the vector elements at index six, the index accumulator register 45 will have a 6 stored therein which is the index indicating that this condition is satisfied at index 6. The signal from flip-flop 25 is applied to AND circuit 31 along with the signal indicating a six in index register 45, and AND circuit 31 applies a signal through OR circuit 35 to the AU output register 47 which thus has a six stored therein. The memory buffer unit at this time will acquire this index of six indicating that the condition established in the option register 23 is met by the comparison of the vector elements $A_6$ and $B_6$.

The output from flip-flop 25 causes adder 27 to accumulate in accumulator register 29 an item count of one added to the count therein indicating that for the condition established for this particular option there is an additional item.

TABLE 1

| Option field | |
|---|---|
| $a_i=b_i$ | —001 [4], 3, 4, 7, 11 |
| $a_i>b_i$ | —010 [8], 0, 1, 2, 5, 6, 8, 9, 10 |
| $a_i\geq b_i$ | —011 [12], 0, 1, 2, 3, 4, 5, 6, 7, 8, 9, 10, 11 |
| $a_i<b_i$ | —100 [4], 12, 13, 14, 15 |
| $a_i\leq b_i$ | —101 [8], 3, 4, 7, 11, 12, 13, 14, 15 |
| $a_i\neq b_i$ | —110 [12], 0, 1, 2, 5, 6, 8, 9, 10, 12, 13, 14, 15 |
| $a_i\leq b_i$ or $a_i>b_i$ | —111 [16], 0 through 15 |
| No test | —000 [0] |

NOTE.—Cond=[(L * CL) + (G * CG) + (E * CE)]

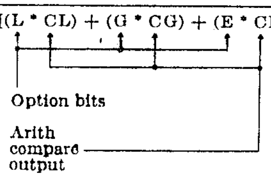

What is claimed is:

1. A computer system for processing a plurality of vector streams, said vector streams each having an array of elements, said processing system comprising a. means for receiving a first vector stream, b. means for receiving a second vector stream, c. means responsive to said first and second receiving means for comparing the elements in said first and second vector streams, d. means responsive to said comparison means for indicating a predetermined relationship between the corresponding elements of said first and second vector streams, and e. means parallel to said comparing means for indicating on an index the elements of said vector streams having said predetermined relationships.

2. The computing system claimed in claim 1 having means to indicate when an element in said first vector stream is equal to a corresponding element in said second vector stream.

3. The computing system claimed in claim 1 having means to indicate when an element in said first vector stream is greater than a corresponding element in said second vector stream.

4. The invention claimed in claim 1 having means for indicating when an element in said first vector stream is less than a corresponding element in said second vector stream.

* * * * *